(No Model.)
G. C. HALE.
ICE CREEPER APPLIANCE FOR HORSESHOES.
No. 586,487. Patented July 13, 1897.
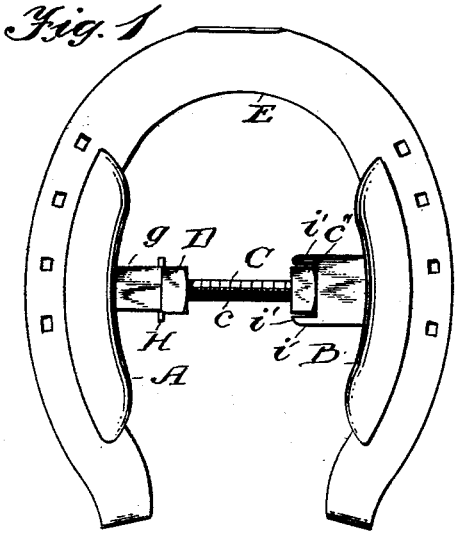
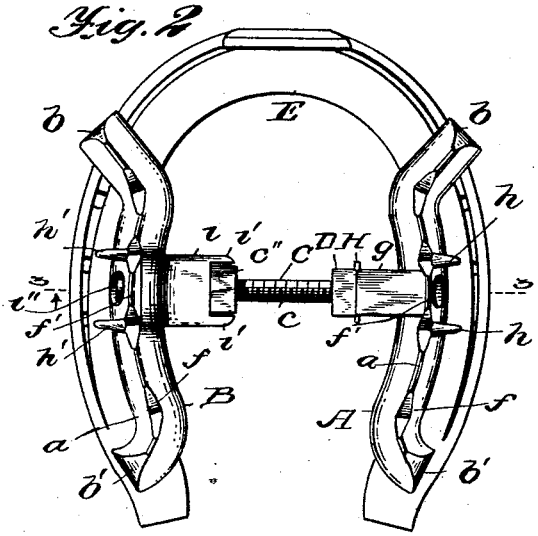
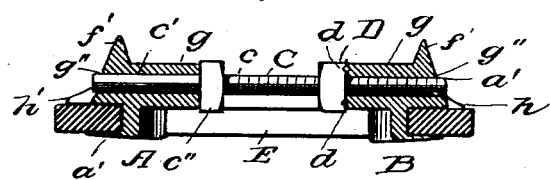
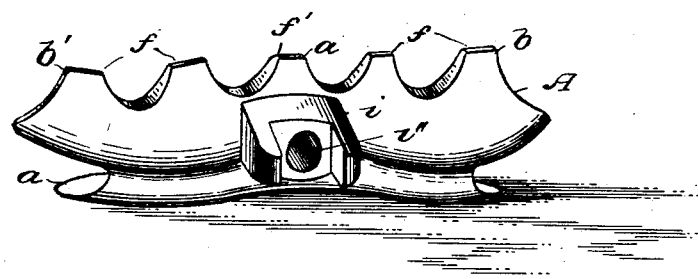
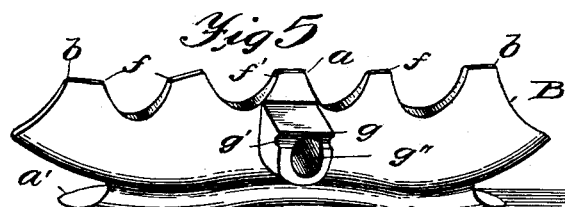
Witnesses
Inventor
George C. Hale

UNITED STATES PATENT OFFICE.

GEORGE C. HALE, OF KANSAS CITY, MISSOURI.

ICE-CREEPER APPLIANCE FOR HORSESHOES.

SPECIFICATION forming part of Letters Patent No. 586,487, dated July 13, 1897.

Application filed December 28, 1896. Serial No. 617,223. (No model.)

*To all whom it may concern:*

Be it known that I, GEORGE C. HALE, a citizen of the United States, residing at Kansas City, in the county of Jackson and State of Missouri, have invented certain new and useful Improvements in Ice-Creeper Appliances for Horseshoes; and I do hereby declare the following to be a full, clear, and exact description of the invention, such as will enable others skilled in the art to which it appertains to make and use the same.

A frequent cause of the injury and loss of horses when shod with ordinary shoes is due to slipping and falling on icy streets and pavements, resulting in breaking their legs or in sustaining such other serious injuries as to necessitate killing the animals. A great many valuable animals are killed from this cause, particularly in cold northern cities, where the street-pavements are heavily coated with ice and sleet during the winter.

One object of my invention is to provide an ice-creeping appliance of simple and cheap construction which may be easily and quickly applied to horseshoes to prevent the shoes from slipping on sleety pavements and enable the animal to obtain such a foothold as to walk on such pavements with a certain degree of safety.

A further object of my invention is to provide an improved simplified means for rigidly and securely fastening the calked shoe-plates on the shoe and to so construct the parts to enable a given size of such shoe-plates to be used on different-sized shoes within certain limits.

To the accomplishment of these ends my invention consists in the improved construction of an ice-creeping appliance for horseshoes and in a novel means for rigidly fastening the same to ordinary kinds of horseshoes, as will be hereinafter fully described and claimed.

To enable others to understand my invention, I have illustrated a preferred embodiment thereof in the accompanying drawings, forming a part of this specification, and in which—

Figure 1 is a top view of a horseshoe equipped with my improved ice-creeper appliance. Fig. 2 is a bottom plan view thereof. Fig. 3 is a vertical transverse sectional view on the plane indicated by the dotted line 3 3 of Fig. 2. Figs. 4 and 5 are detail perspective views of the two shoe-plates.

Like letters of reference denote corresponding parts in all the figures of the drawings, referring to which—

A B designate the two plates to be applied to the shoe. C is the tightener-bolt, and D is the nut of my creeper appliance for ordinary horseshoes, one style of which is indicated at E in the drawings.

The toe-plates A B are each cast or wrought in a single piece of metal, preferably of cast-steel, and they are curved to fit to the right and left hand sides, respectively, of a horseshoe. Each plate is curved for a portion of its length, as at $a$, and the ends of the plate are extended at $b\ b$ at an angle to the line of general direction of the curved part $a$ of the plate. Each plate is formed with a rib constituting a channel or groove $a'$ to enable the plate to be fitted snugly to the shoe, whereby the plate is given a good broad bearing on the shoe because the angular ends $b\ b'$ and the walls of the channel overlap the shoe considerably, as shown by Figs. 1 to 3. The plates are further provided with the series of calks $f\ f'$, which depend for a suitable distance and are sharpened, thus presenting good surfaces to penetrate ice and sleet and enable the animal to retain its foothold.

On the inner side of the plate A is formed an elongated arm $g$, which projects centrally from the plate and on the line of the central calk $f'$. On the end face of this arm is formed a groove or key-seat $g'$, and through the lug $g$ is formed a longitudinal hole or passage $g''$, which extends through the plate A, as shown by Fig. 3. From the outer side of the plate A, on a plane above the channel $a'$ therein, extend the middle lugs $h\ h$, which are adapted to rest upon the lower side of the shoe and to brace the plate centrally on said shoe while the angular ends $b\ b'$ brace the ends of the plate. The other plate B is likewise provided with a pair of middle lugs $h'\ h'$, adapted to bear on the under face of the shoe when the channeled edge of the plate is fitted to the side of the shoe. This plate B is likewise formed with an integral arm $i$, which projects from the central portion on the inner side of the plate B, and this arm $i$ is notched or forked to provide the fingers $i'$, a longitudinal hole or passage $i''$ being provided through said arm and extending through the plate B above the plane of the channel $a'$ therein.

The bolt C is threaded, preferably, for a part of its length with a continuous screw-thread, as at $c$, leaving one end $c'$ smooth or plain. This bolt at a point between the threaded and smooth parts is provided with a collar or nut $c''$. If a nut is used, it is screwed on the bolt as far as it will go to rest solidly against the end thread and thus remain fixed and immovable on the bolt; if a collar, it may be wrought as a part of the bolt or it may be rigidly applied thereto in any suitable way.

The adjustable nut D is fitted on the bolt to work back and forth on the threaded part $c$, and in one face of the nut are provided the channels or keyways $d$ $d$, one of which is adapted to aline with the groove $g'$ in the arm $g$ of the plate A for the purpose of providing a seat to receive the key or pin H.

The two plates A B have the channels $a'$ formed therein, of such size as to enable them to fit to horseshoes of different sizes within certain limits.

It is well known that in paring or trimming a horse's hoof preparatory to the application of the shoe thereto the hoof is so trimmed as to leave a concavity at the center thereof and allow the solid wall to bear upon the shoe. Consequently a space or opening from a sixteenth of an inch to one-eighth of an inch is left between the hoof and the inner edge of the shoe. In applying my shoe-plates they are fitted to the right and left to have the ribs bear upon the space between the hoof and the inner edge of the shoe, which leave ample spaces for the proper bearing of the continuous ribs on the upper sides of the shoe. The other rib or flange, forming the lower wall of the channel, and the angular ends $b$ $b'$ and lugs $h$ $h'$ provide ample bearings against the lower sides of the shoe. The smooth end $c'$ of the bolt is fitted in the passage $i''$ of the arm $i$ on plate B to have the nut or collar fit in the notch between the forked fingers $i'$, thus holding the bolt against axial or rotary movement, and the threaded end of the bolt fits in the passage $g''$ in the arm $g$ on plate A, the nut D occupying a position between the two arms $g$ $i$ of the plates A B. The nut D is now turned by a suitable wrench or implement toward the arm $g$, against which it presses, and the nut is turned so as to force back the bolt and the nut or collar thereon, whereby the bolt and adjustable nut press the plates A B apart and cause them to bear firmly on the shoe. The plates are thus held rigidly and firmly on the shoe, and when the parts have been secured the nut itself is turned to bring one of its grooves $d$ in alinement with the groove $g'$ to form a key-seat, into which is firmly driven the key or pin H, whereby the nut is locked and the parts are prevented from working loose.

It is thought that the operation and advantages of my improvement will be readily understood and appreciated from the foregoing description, taken in connection with the drawings.

I am aware that minor changes in the form and proportion of parts and in the details of construction may be made by a skilled mechanic without departing from the spirit or sacrificing the advantages of my invention, and I therefore reserve the right to make such modifications as fairly fall within the scope of the invention.

Having thus fully described my invention, what I claim as new, and desire to secure by Letters Patent, is—

1. An ice-creeper appliance for horseshoes, comprising a pair of channeled plates having calks on the lower sides thereof, one plate provided with a forked hollow arm, and the other plate having a grooved or notched hollow arm, a non-rotatable bolt having a collar or nut to fit the forked arm of one plate, an adjustable nut with a grooved face arranged next to the arm with the notch or groove therein on the other plate, and a key or pin to fit in said notches or grooves of the adjustable nut and the arm of the last-mentioned plate, as set forth.

2. The combination with a horseshoe, of the channeled plates A, B shaped to fit the respective sides of said shoe and having the angular ends $b$, $b'$, the middle lugs, and the hollow grooved arm $g$ and the hollow forked arm $i$, respectively, a non-rotatable bolt fitted in said hollow arms and provided with a nut or collar which lies within the forked arm of one plate, a grooved nut fitted on the bolt and bearing against the grooved face of the arm on the other plate, and a key, substantially as described.

3. An ice-creeper appliance for horseshoes, comprising a pair of plates to fit the respective sides of the horseshoe, one plate provided with an inwardly-extending forked arm, and the other plate having an inwardly-extending arm the end face of which has a groove or grooves, the non-rotatable bolt having an enlargement fitted in the forked arm of one plate, an adjustable grooved nut threaded on the bolt and adapted to abut against the grooved face of the arm on the other plate, and a key or pin fitted in coincident grooves of the abutting faces of said arm and the adjustable nut, as and for the purposes described.

In testimony whereof I affix my signature in presence of two witnesses.

GEORGE C. HALE.

Witnesses:
W. J. FETTER,
E. P. SEXTON.